(12) United States Patent
Irie et al.

(10) Patent No.: US 11,013,061 B2
(45) Date of Patent: *May 18, 2021

(54) COMMUNICATION METHOD AND COMMUNICATION DEVICE

(71) Applicant: Apple Inc., Cupertino, CA (US)

(72) Inventors: Masataka Irie, Kanagawa (JP); Lei Huang, Singapore (SG); Hong Cheng Michael Sim, Singapore (SG)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,215

(22) Filed: Jul. 2, 2019

(65) Prior Publication Data

US 2019/0327788 A1    Oct. 24, 2019

Related U.S. Application Data

(63) Continuation of application No. 15/653,223, filed on Jul. 18, 2017, now Pat. No. 10,397,979, which is a
(Continued)

(30) Foreign Application Priority Data

Mar. 19, 2015    (JP) .................. 2015-056352

(51) Int. Cl.
*H04W 84/12* (2009.01)
*H04L 5/00* (2006.01)
(Continued)

(52) U.S. Cl.
CPC .......... *H04W 84/12* (2013.01); *H04B 7/0623* (2013.01); *H04L 5/0053* (2013.01);
(Continued)

(58) Field of Classification Search
CPC ..... H04L 1/0038; H04L 5/001; H04L 5/0042; H04L 5/0053; H04L 5/0007;
(Continued)

(56) References Cited

U.S. PATENT DOCUMENTS

| | | |
|---|---|---|
| 2010/0135238 A1 | 6/2010 | Sadri et al. |
| 2010/0195600 A1 | 8/2010 | Gorokhov et al. |

(Continued)

FOREIGN PATENT DOCUMENTS

| | | |
|---|---|---|
| JP | 2013-143624 A | 7/2013 |
| WO | 2015/038175 A1 | 3/2015 |

OTHER PUBLICATIONS

IEEE Std 802.11ad(TM)—2012, "Part 11: Wireless LAN Medium Access Control (MAC) and Physical Layer (PHY) Specifications, Amendment 3. Enhancements for Very High Throughout in the 60 GHz Band", Dec. 28, 2012.

(Continued)

*Primary Examiner* — Awet Haile
(74) *Attorney, Agent, or Firm* — Kilpatrick Townsend & Stockton LLP

(57) ABSTRACT

There is provided a communication method for a coordinator communication device, including generating a first scheduling element to be used by a first communication device and a second scheduling element to be used by a second communication device; and transmitting the first and second scheduling elements to the first and second communication devices. The second scheduling element includes a second allocation indicating a time-frequency resource allocated to the second communication device. The first scheduling element includes a first allocation indicating a time-frequency resource allocated to the first communication device and optionally includes a first virtual allocation that is a duplicate of the second allocation. The first communi- (Continued)

cation device performs communication in accordance with a first communication system using a first frequency band, and the second communication device performs communication in accordance with the first communication system or a second communication system using a second frequency band that includes the first frequency band.

18 Claims, 15 Drawing Sheets

Related U.S. Application Data continuation of application No. PCT/JP2016/000180, filed on Jan. 15, 2016.

(51) Int. Cl.
*H04B 7/06* (2006.01)
*H04W 16/14* (2009.01)
*H04W 28/06* (2009.01)
*H04W 72/12* (2009.01)
*H04W 72/04* (2009.01)
*H04W 72/08* (2009.01)
*H04L 12/863* (2013.01)
*H04W 48/12* (2009.01)
*H04W 40/24* (2009.01)
*H04W 74/04* (2009.01)

(52) U.S. Cl.
CPC .......... *H04L 5/0073* (2013.01); *H04L 5/0091* (2013.01); *H04W 16/14* (2013.01); *H04W 28/06* (2013.01); *H04W 72/0453* (2013.01); *H04W 72/08* (2013.01); *H04W 72/1289* (2013.01); *H04L 47/50* (2013.01); *H04W 40/24* (2013.01); *H04W 48/12* (2013.01); *H04W 74/04* (2013.01)

(58) Field of Classification Search
CPC ... H04L 5/0037; H04L 5/0076; H04L 5/0094; H04W 72/0446; H04W 72/1284; H04W 72/1289; H04W 72/14; H04W 88/08; H04W 72/044; H04W 72/0406; H04W 72/085; H04W 72/1242
See application file for complete search history.

(56) References Cited

U.S. PATENT DOCUMENTS

| | | |
|---|---|---|
| 2012/0120892 A1 | 5/2012 | Freda et al. |
| 2014/0017754 A1 | 1/2014 | Kale et al. |
| 2014/0078928 A1 | 3/2014 | Verma et al. |
| 2014/0177543 A1* | 6/2014 | Cordeiro .............. H04B 7/0623 370/329 |
| 2016/0337906 A1 | 11/2016 | Cordeiro |
| 2018/0255537 A1* | 9/2018 | Park ........................ H04L 5/001 |

OTHER PUBLICATIONS

International Search Report, dated Mar. 29, 2016, for International Application No. PCT/JP2016/000180.
The Extended European Search Report dated Jan. 14, 2020 for the related European Patent Application No. 16764359.2.
Brazilian Search Report dated Jul. 9, 2020 for the related Brazilian Patent Application No. 112017015957-0, 4 pages. (With English Machine Translation).
Indian Examination Report dated Dec. 14, 2020 for the related Indian Patent Application No. 201747028303, 5 pages.

* cited by examiner

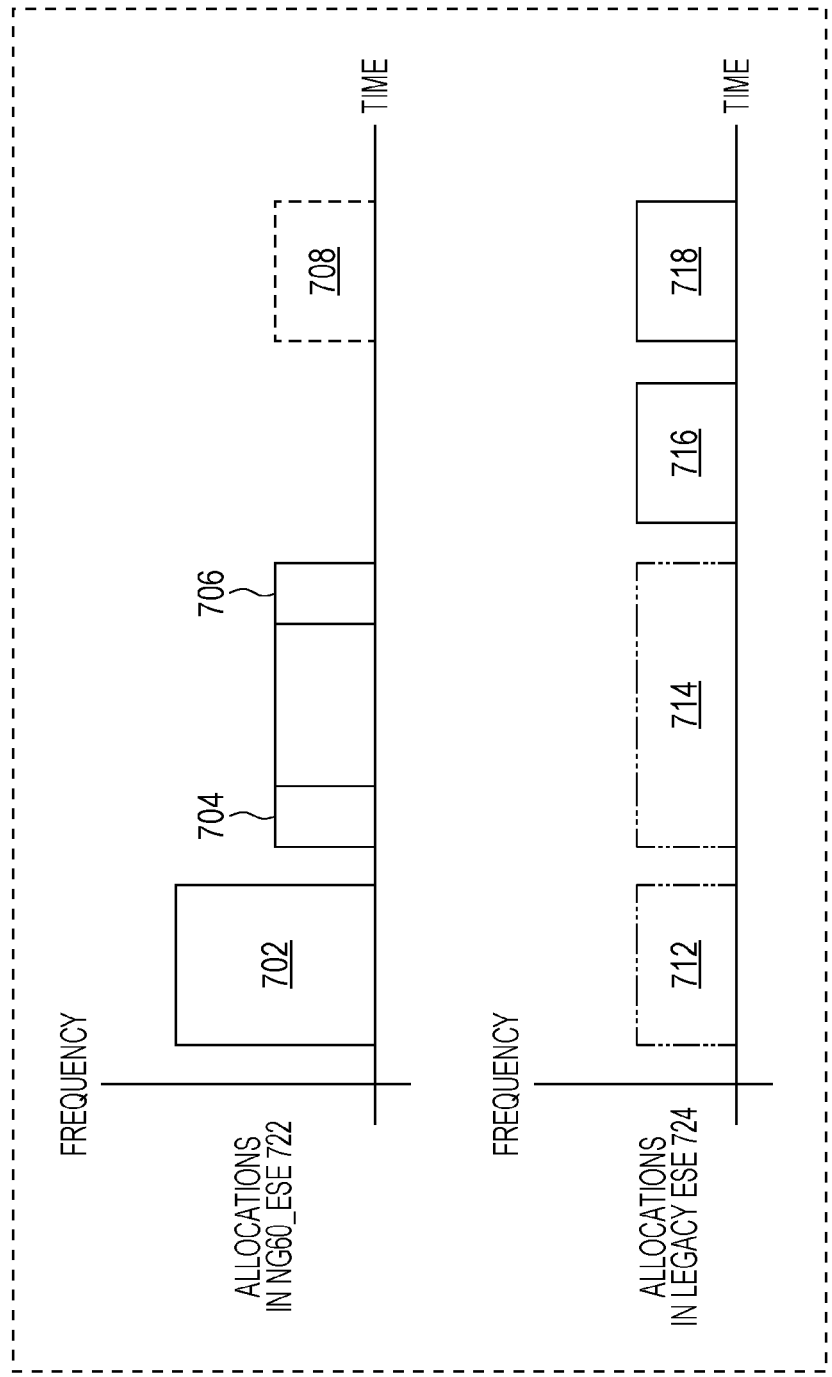

COMMUNICATION METHOD AND COMMUNICATION DEVICE

BACKGROUND

1. Technical Field

The present disclosure relates to a communication method and a communication device and specifically relates to a communication method and a communication device for suppressing interference in a WLAN (wireless local area network).

2. Description of the Related Art

A 60-GHz millimeter-wave network that requires no license is receiving increasing attention. The wireless HD technology is the first industry standard for the 60-GHz millimeter wave and enables multi-gigabit wireless streaming of high-definition sounds, videos, and data between home electrical appliances, personal computers, and portable devices.

As another multi-gigabit wireless communication technology operating on the 60-GHz millimeter frequency band, the WiGig (Wireless Gigabit) technology is available. The WiGig technology is standardized by IEEE (Institute of Electrical and Electronics Engineers) as the IEEE 802.11ad standard (see IEEE 802.11ad-2012). The WiGig technology uses a wide channel bandwidth of 2.16 GHz to provide PHY (physical layer) data rates of up to 6.7 Gbps.

The MAC (Medium Access Control) layer of WiGig supports a centralized network architecture, such as an infrastructure BSS (basic service set) or a PBSS (personal BSS). In this architecture, a central coordinator (for example, an AP (access point) or a PCP (personal BSS control point), hereinafter referred to as a PCP/AP) transmits DMG (directional multi-gigabit) beacons to synchronize all STAs (stations) on the network.

On the MAC layer of WiGig, a mechanism called PCP/AP clustering is introduced in order to enable spatial sharing and interference mitigation with other BSSs using the same channel. In the PCP/AP clustering, transmission is scheduled so that a clustering-capable PCP/AP that is a member of a cluster performs transmission in a period that does not overlap those of other members in the same cluster.

In the PCP/AP clustering, scheduling information regarding channel time allocation is included in an ESE (extended schedule element). A PCP/AP transmits a DMG beacon including one or more ESEs in accordance with a time-division system.

As a technology for achieving a data rate higher than that of existing WiGig (hereinafter referred to as legacy WiGig) devices, a technology called NG60 (next-generation 60 GHz) WiGig (hereinafter referred to as NG60_WiGig) is being developed. In order for NG60_WiGig to achieve PHY data rates of up to several tens of Gbps, a technology for supporting MIMO (multiple input, multiple output) transmission and a variable channel bandwidth while maintaining downward compatibility with legacy WiGig devices is desirable.

In an NG60_WiGig network, a PCP/AP based on NG60_WiGig that is a coordinator communication device (hereinafter referred to as an NG60_PCP/AP) can coexist with a neighboring PCP/AP based on legacy WiGig (hereinafter referred to as a legacy PCP/AP) in the same PCP/AP cluster or in a different PCP/AP cluster due to downward compatibility.

Meanwhile, an ESE based on NG60_WiGig (hereinafter referred to as an NG60_ESE) has a format different from that of an ESE based on legacy WiGig (hereinafter referred to as a legacy ESE), and therefore, a legacy PCP/AP has difficulty in decoding an NG60_ESE transmitted by an NG60_PCP/AP. Because of the difficulty in decoding an NG60_ESE, a legacy PCP/AP has difficulty in obtaining scheduling information included in the NG60_ESE. Accordingly, the legacy PCP/AP has difficulty in rescheduling channel time allocation thereof or performing any other appropriate operations.

SUMMARY

One non-limiting and exemplary embodiment provides a communication method and a communication device for generating an ESE (extended schedule element) for rescheduling channel time allocation or performing any other appropriate operations in an environment in which a communication device based on legacy WiGig and a communication device based on NG60_WiGig coexist.

In one general aspect, the techniques disclosed here feature a communication method for a coordinator communication device, the communication method including: generating a first scheduling element to be used by at least one first communication device and a second scheduling element to be used by at least one second communication device; and transmitting the first scheduling element and the second scheduling element to the at least one first communication device and to the at least one second communication device. The second scheduling element includes at least one second allocation that indicates a time-frequency resource allocated to the at least one second communication device. The first scheduling element includes at least one first allocation that indicates a time-frequency resource allocated to the at least one first communication device and optionally includes at least one first virtual allocation that is a duplicate of the at least one second allocation. The at least one first communication device performs communication in accordance with a first communication system using a first frequency band. The at least one second communication device performs communication in accordance with the first communication system or a second communication system using a second frequency band that includes the first frequency band.

According to one aspect of the present disclosure, scheduling information included in an NG60_ESE is duplicated and is included in a legacy ESE to thereby generate an ESE (extended schedule element) for rescheduling channel time allocation or performing any other appropriate operations in an environment in which a communication device based on legacy WiGig and a communication device based on NG60_WiGig coexist.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7A is a diagram illustrating a second example of allocations in accordance with an NG60_ESE and a legacy ESE according to an embodiment of the present disclosure;

DETAILED DESCRIPTION

The present disclosure relates to a communication device and a communication method for generating an ESE (extended schedule element) in an environment in which a communication device based on legacy WiGig and a communication device based on NG60_WiGig coexist.

Figure 1:
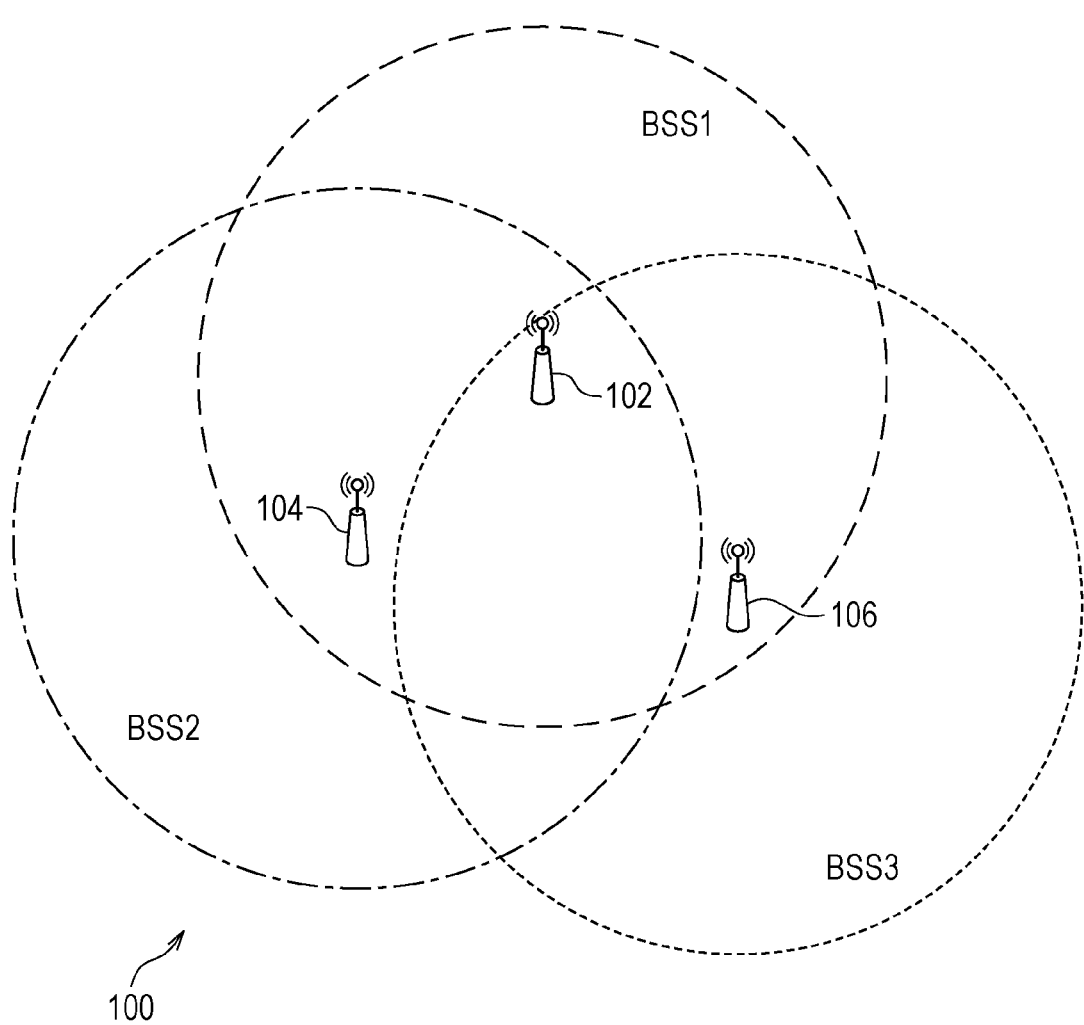
FIG. 1 is a diagram illustrating an example of PCP/AP clustering based on legacy WiGig.

FIG. 1 is a diagram illustrating an example of PCP/AP clustering based on legacy WiGig. A PCP/AP cluster 100 includes clustering-capable PCP/APs 102, 104, and 106 that operate on the same channel. In FIG. 1, the PCP/AP 102 is an S-PCP/S-AP (synchronization PCP/synchronization AP) 102, and the PCP/APs 104 and 106 are member PCP/APs 104 and 106 respectively. The PCP/AP cluster 100 includes STAs (not illustrated) that are associated with the PCP/APs.

Figure 2A:
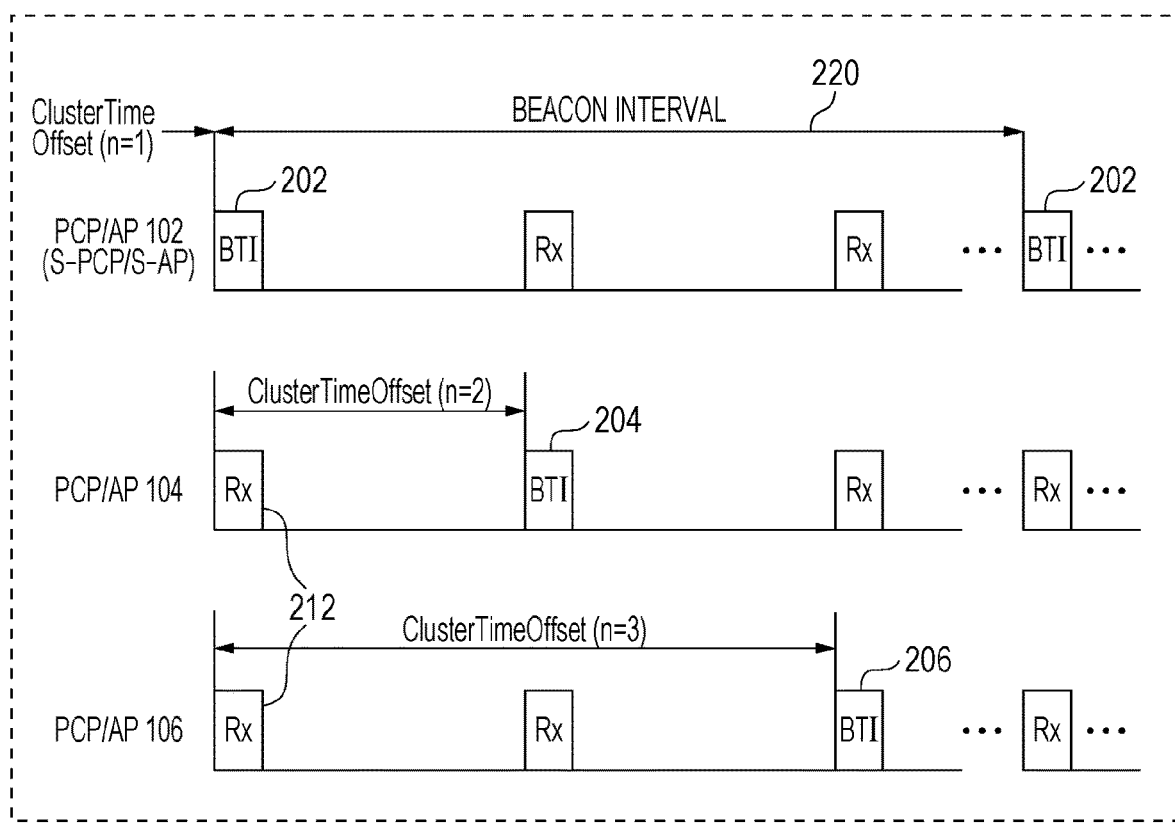
FIG. 2A is a diagram illustrating example operations in the PCP/AP clustering illustrated in FIG. 1.
Figure 2B:
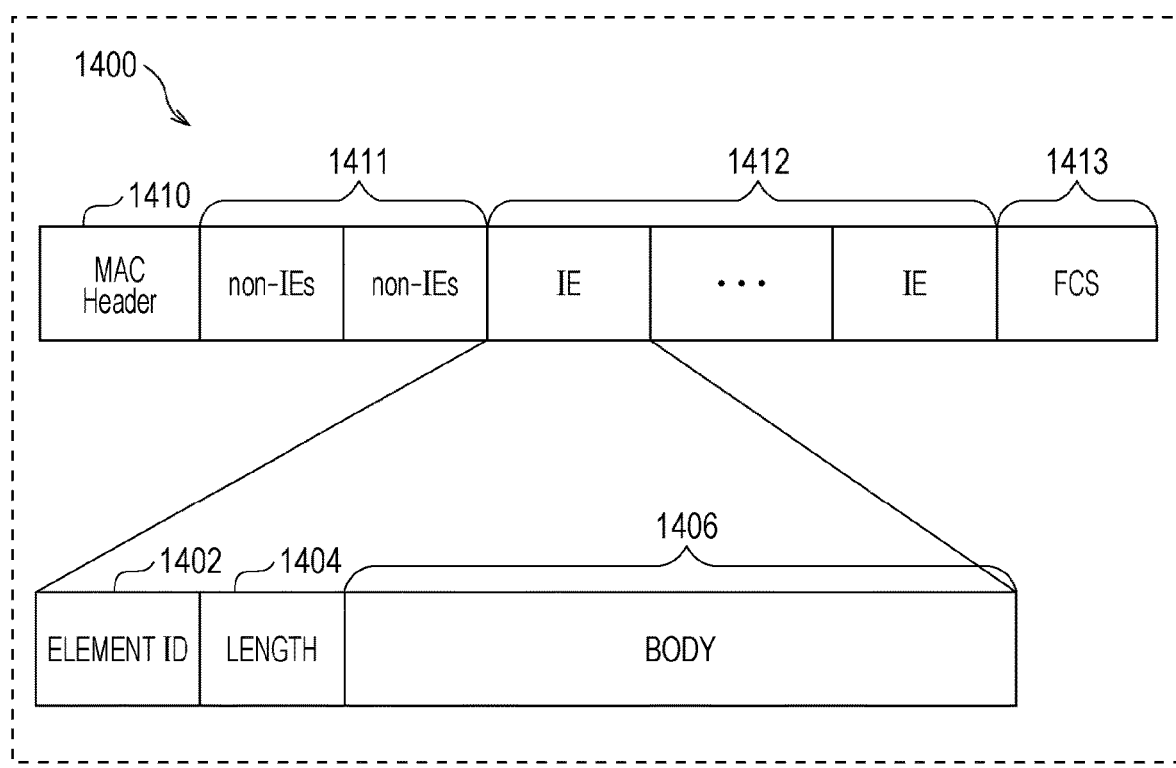
FIG. 2B is a diagram illustrating an example of a DMG beacon.

FIG. 2A is a diagram illustrating an example operation of each of the PCP/APs in the PCP/AP clustering illustrated in FIG. 1. The PCP/APs 102, 104, and 106 transmit DMG beacons in accordance with a time-division system. FIG. 2B is a diagram illustrating an example structure of a DMG beacon frame. A DMG beacon 1400 includes one MAC header 1410, at least one non-IE (non-information element) 1411, at least one IE (information element) 1412, and an FCS (frame check sequence) 1413. In the IEEE 802.11ad standard, a plurality of types of IEs are defined, and an IE of any type includes an element ID 1402, a length 1404, and a body 1406. One of the IE types is an ESE (extended schedule element). A DMG beacon includes at least one ESE. The ESE includes scheduling information regarding channel time allocation.

Note that, in FIG. 2A, the S-PCP/S-AP 102 performs scheduling in a period from a beacon transmission interval (BTI) 202 to a BTI 204 in which transmission from the S-PCP/S-AP 104 is performed, and the member PCP/AP 104 performs scheduling in a period from the BTI 204 to a BTI 206 in which transmission from the member PCP/AP 106 is performed.

The S-PCP/S-AP 102 transmits DMG beacons during the period of the BTI (beacon transmission interval) 202 within a beacon interval 220. The member PCP/APs 104 and 106 receive, during the period of an Rx (reception interval) 212 (a standby state), the DMG beacons transmitted by the S-PCP/S-AP 102 during the period of the BTI 202.

The member PCP/AP 104 transmits DMG beacons during the period of the BTI 204, which is a period a predetermined time interval (indicated by "Cluster Time Offset (n=2)") after the Rx 212. The PCP/AP 106 transmits DMG beacons during the period of the BTI 206, which is a period a predetermined time interval (indicated by "Cluster Time Offset (n=3)") after the Rx 212.

As illustrated in FIG. 2A, in the PCP/AP clustering, different offsets from the time point of the start of DMG beacon transmission from the PCP/AP 102 are allocated to the respective PCP/APs. Accordingly, the PCP/APs can start transmitting their DMG beacons on the basis of the allocated offsets respectively.

The member PCP/APs 104 and 106 can directly receive a DMG beacon from the S-PCP/S-AP 102, and therefore, can receive an ESE from the S-PCP/S-AP 102.

A member PCP/AP (for example, the member PCP/AP 106) has difficulty in directly receiving a DMG beacon transmitted from another member PCP/AP (for example, the PCP/AP 104) but can receive an ESE via an STA associated therewith. Specifically, an STA associated with the member PCP/AP 106 receives a DMG beacon including an ESE from the member PCP/AP 104 and transmits one or more frames that include the received ESE to the member PCP/AP 106.

Further, a PCP/AP that belongs to the PCP/AP cluster 100 directly receives an ESE from a clustering-capable PCP/AP that does not belong to the PCP/AP cluster 100 or receives such an ESE via an STA associated therewith. The PCP/AP, which receives an ESE from another clustering-capable PCP/AP, can reschedule allocation thereof in the beacon interval, change the BTI, change the cluster time offset, or perform other appropriate operations as an attempt to suppress interference with transmission indicated by the received ESE.

In general, the WiGig technology is used to replace cables in a wired digital interface. For example, the WiGig technology is used to implement a wireless USB (universal serial bus) link for initial synchronization between smartphones or between tablets or a wireless HDMI (high-definition multimedia interface) (registered trademark) link for video streaming. State-of-the-art wired digital interfaces (for example, USB 3.5 and HDMI 1.3) can achieve data rates of up to several tens of Gbps, and therefore, the WiGig technology needs to be evolved so as to match these interfaces.

As a technology for achieving PHY data rates of up to several tens of Gbps, a technology called NG60 (next-generation 60 GHz) WiGig (hereinafter referred to as NG60_WiGig) is being developed.

Here, the format of an ESE based on legacy WiGig (that is, a legacy ESE) is different from the format of an NG60_ESE according to the related art. First, the format of a legacy ESE is described.

Figure 3:
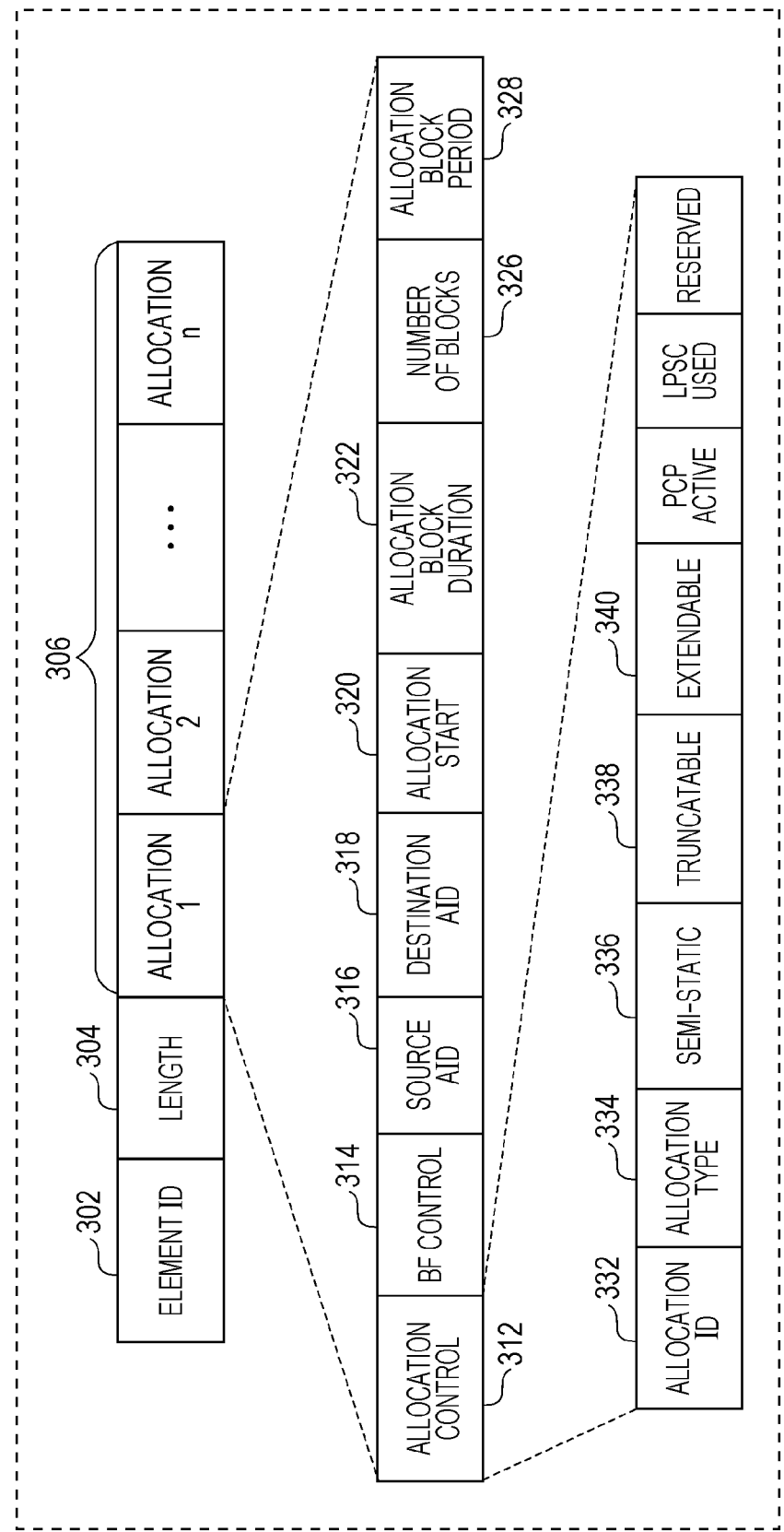
FIG. 3 is a diagram illustrating the format of an ESE based on legacy WiGig.

FIG. 3 is a diagram illustrating the format of an ESE based on legacy WiGig (that is, a legacy ESE). The format of the legacy ESE includes an element ID field 302, a length field 304, and a plurality of allocation fields 306.

The element ID field 302 is a field for uniquely identifying the legacy ESE. The length field 304 is a field for specifying the number of octets of the plurality of allocation fields 306.

Each of the allocation fields 306 is a field that indicates scheduling information regarding channel time allocation. The allocation field 306 includes an allocation control field 312, a BF (beamforming) control field 314, a source AID (association identifier) field 316, a destination AID field 318, an allocation start field 320, an allocation block duration field 322, a number-of-blocks field 326, and an allocation block period field 328.

The allocation control field 312 includes an allocation ID field 332, an allocation type field 334, a semi-static field 336, a truncatable field 338, an extendable field 340, and other fields.

The allocation type field 334 indicates whether the channel access mechanism used upon allocation is based on a CBAP (contention-based access period) or an SP (service period).

The source AID field 316 is a field for specifying an STA that starts channel access when the SP or the CBAP is allocated. Alternatively, the source AID field 316 is set to a broadcast AID in a case of CBAP allocation and if all STAs are allowed to perform transmission when the CBAP is allocated.

The destination AID field 318 is a field for specifying an STA that is expected to communicate with the source STA upon allocation. Alternatively, the destination AID field 318 is set to a broadcast AID in a case where all STAs are expected to communicate with the source STA upon allocation.

The allocation ID field 332 is a field for identifying airtime allocation for communication from the source STA specified by the source AID to the STA specified by the destination AID if the allocation ID field 332 is set to a value other than 0. The allocation ID field 332 is set to 0 in the case of CBAP allocation where the broadcast source AID and the broadcast destination AID are used.

Except for the case of CBAP allocation where the broadcast source AID and the broadcast destination AID are used, a tuple (the source AID, the destination AID, and the allocation ID) is used to uniquely identify the allocation.

The semi-static field 336 indicates whether the allocation is semi-static. The semi-static allocation is repeated in several beacon intervals for the same duration with the same time offset after an ESE including semi-static allocation has been received last. The truncatable field 338 indicates whether the source STA and the destination STA can request truncation of the SP (service period), and the extendable field 340 indicates whether the source STA and the destination STA can request extension of the SP.

The allocation start field 320 indicates the timing at which the SP or the CBAP starts. The allocation block duration field 322 indicates the duration of a time block over which the SP or the CBAP is allocated and which does not extend beyond the boundary of the beacon interval.

The number-of-blocks field 326 includes the number of time blocks that constitute the allocation. The allocation block period field 328 includes a time between the start of one of the two consecutive time blocks that belong to the same allocation and the start of the other. The allocation start field 320, the allocation block duration field 322, the number-of-blocks field 326, and the allocation block period field 328 are used together to specify the position of the allocation in the time domain.

Next, the format of an NG60_ESE according to the related art is described.

Figure 4:
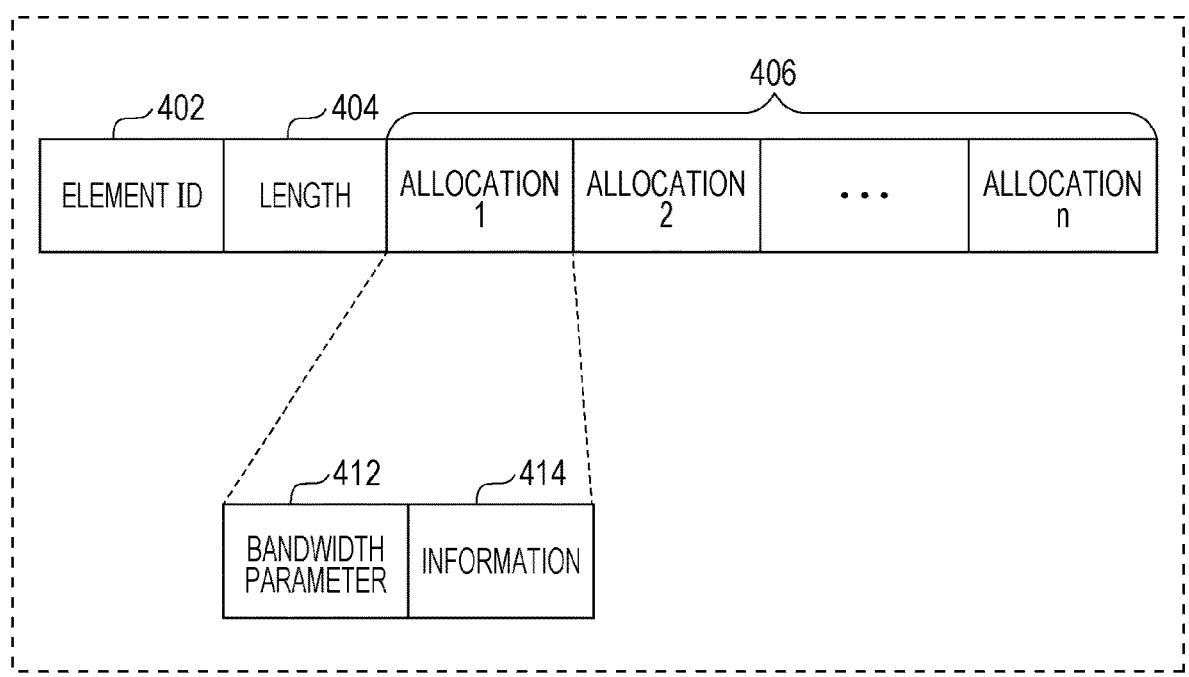
FIG. 4 is a diagram illustrating the format of an NG60_ESE described in US Patent Application No. 2014/0177543.

FIG. 4 is a diagram illustrating the format of an NG60_ESE described in US Patent Application No. 2014/0177543. The format of the NG60_ESE includes an element ID field 402, a length field 404, and a plurality of allocation fields 406.

The element ID field 402 is a field for uniquely identifying the NG60_ESE. The length field 404 is a field for specifying the number of octets of the plurality of allocation fields 406. That is, the element ID field 402 and the length field 404 are the same as the element ID field 302 and the length field 304 illustrated in FIG. 3.

Each of the allocation fields 406 is a field that indicates scheduling information regarding channel time allocation. The allocation field 406 includes a bandwidth parameter field 412 and an information field 414. The bandwidth parameter field 412 indicates the channel bandwidth of the corresponding allocation. The information field 414 includes information, data, or both information and data that are included in the allocation field 306 in the legacy ESE as specified in FIG. 3.

That is, the format of the NG60_ESE illustrated in FIG. 4 includes the bandwidth parameter field 412, which is a difference from the format of the legacy ESE illustrated in FIG. 3.

As illustrated in FIG. 3 and FIG. 4, the format of the NG60_ESE is different from the format of the legacy ESE. Therefore, a legacy PCP/AP is unable to decode the NG60_ESE and has difficulty in recognizing allocations included in the NG60_ESE. Accordingly, the legacy PCP/AP has difficulty in rescheduling channel time allocation thereof or performing any other appropriate operations.

In view of such circumstances, the present disclosure is made while focusing on the difference in format between the legacy ESE and the NG60_ESE.

Hereinafter, an embodiment of the present disclosure is described with reference to the drawings. Note that an embodiment described below is an example, and the present disclosure is not limited by the embodiment. In the following description, detailed description of publicly known functions and structures included herein is omitted in order to provide clear and brief description.

Embodiment

Figure 5:
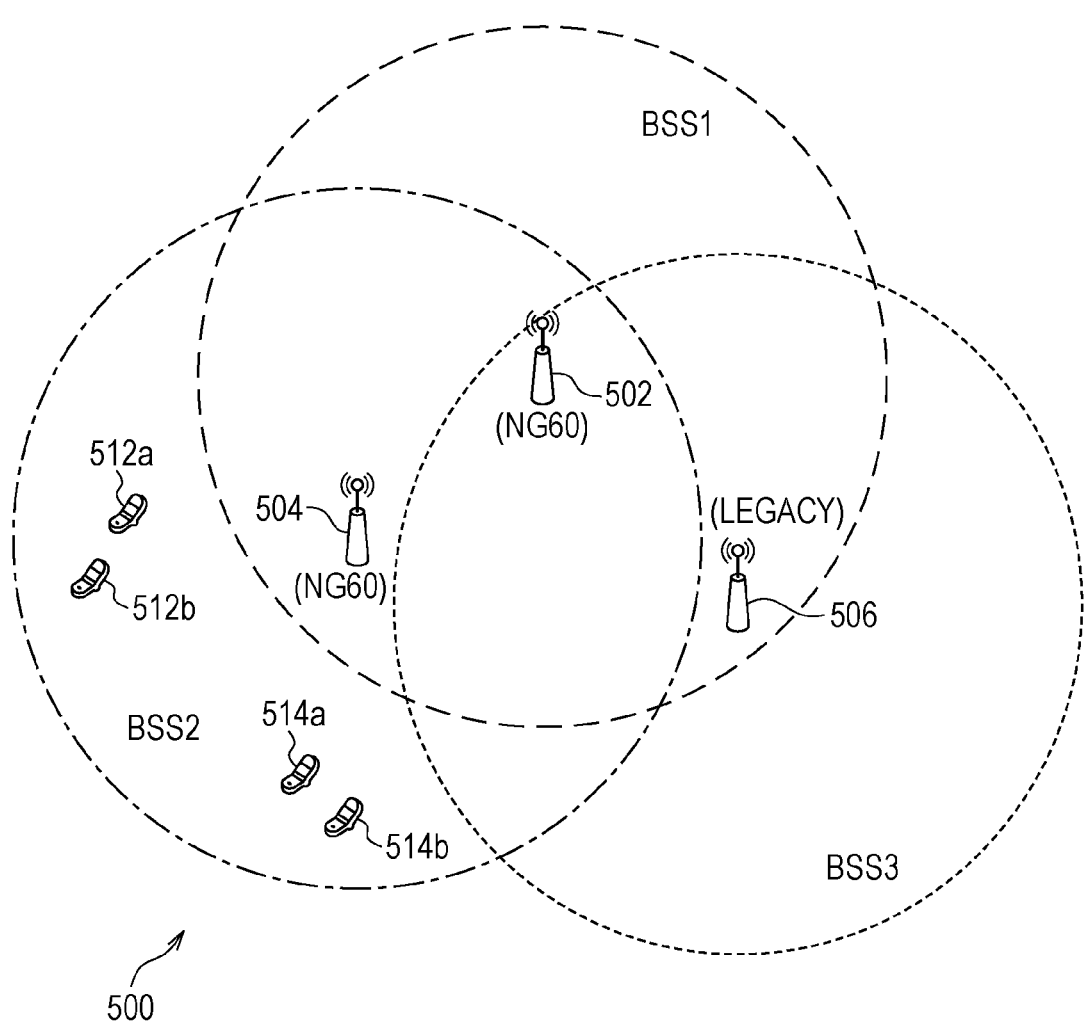
FIG. 5 is a diagram illustrating an example of PCP/AP clustering according to an embodiment of the present disclosure.

FIG. 5 is a diagram illustrating an example of PCP/AP clustering according to an embodiment of the present disclosure. A PCP/AP cluster 500 includes clustering-capable NG60_PCP/APs 502 and 504 and a clustering-capable legacy PCP/AP 506. In FIG. 5, the NG60_PCP/AP 502 is an S-PCP/S-AP (synchronization PCP/synchronization AP), and the NG60_PCP/AP 504 and the legacy PCP/AP 506 are member PCP/APs.

The PCP/AP cluster 500 includes STAs 512a, 512b, 514a, and 514b, which are associated with the NG60_PCP/AP 504. Each of the STAs 512a, 512b, 514a, and 514b is an STA based on NG60_WiGig (hereinafter referred to as an NG60_STA) or an STA based on legacy WiGig (hereinafter referred to as a legacy STA).

The legacy PCP/AP 506 transmits a beacon including a legacy ESE. The NG60_PCP/APs 502 and 504 transmit a DMG beacon including both an NG60_ESE and a legacy ESE.

The legacy ESE is used to specify allocations for transmission related to a legacy STA. That is, in a case of an allocation in the legacy ESE, at least one of the source AID and the destination AID indicates a legacy STA. In other words, at least the other of the source AID and the destination AID may indicate an NG60_STA. This is because an NG60_STA has downward compatibility.

The NG60_ESE is used to define allocations for transmission related to an NG60_STA. That is, in a case of an allocation in the NG60_ESE, both the source AID and the destination AID respectively indicate NG60_STAs.

In a case where no legacy STA is associated with the NG60_PCP/APs 502 and 504 that transmit DMG beacons, an allocation in which at least one of the source AID and the destination AID is a broadcast AID may be defined in the NG60_ESE. Otherwise, such an allocation may be specified in the legacy ESE.

An allocation defined in the legacy ESE corresponds to transmission on a single channel bandwidth of 2.16 GHz. On the other hand, an allocation specified in the NG60_ESE corresponds to transmission on a variable channel bandwidth (for example, 2.16 GHz, 4.32 GHz, 6.48 GHz, or 8.64 GHz).

As described above, an allocation for transmission related to an NG60_STA can be included in both a legacy ESE and an NG60_ESE. Therefore, after an NG60_STA associated with an NG60_PCP/AP has received a DMG beacon including an NG60_ESE and a legacy ESE from the NG60_PCP/AP, the NG60_STA usually needs to analyze both the NG60_ESE and the legacy ESE in order to recognize allocations for transmission related thereto. An NG60_PCP/AP according to the present disclosure transmits an NG60_ESE so as to allow an NG60_STA to recognize allocations for transmission related thereto by analyzing the NG60_ESE.

Specifically, an NG60_PCP/AP generates a duplicate of some of the allocations in a legacy ESE for transmission related to both an NG60_STA and a legacy STA and includes the duplicate in an NG60_ESE.

Figure 6:
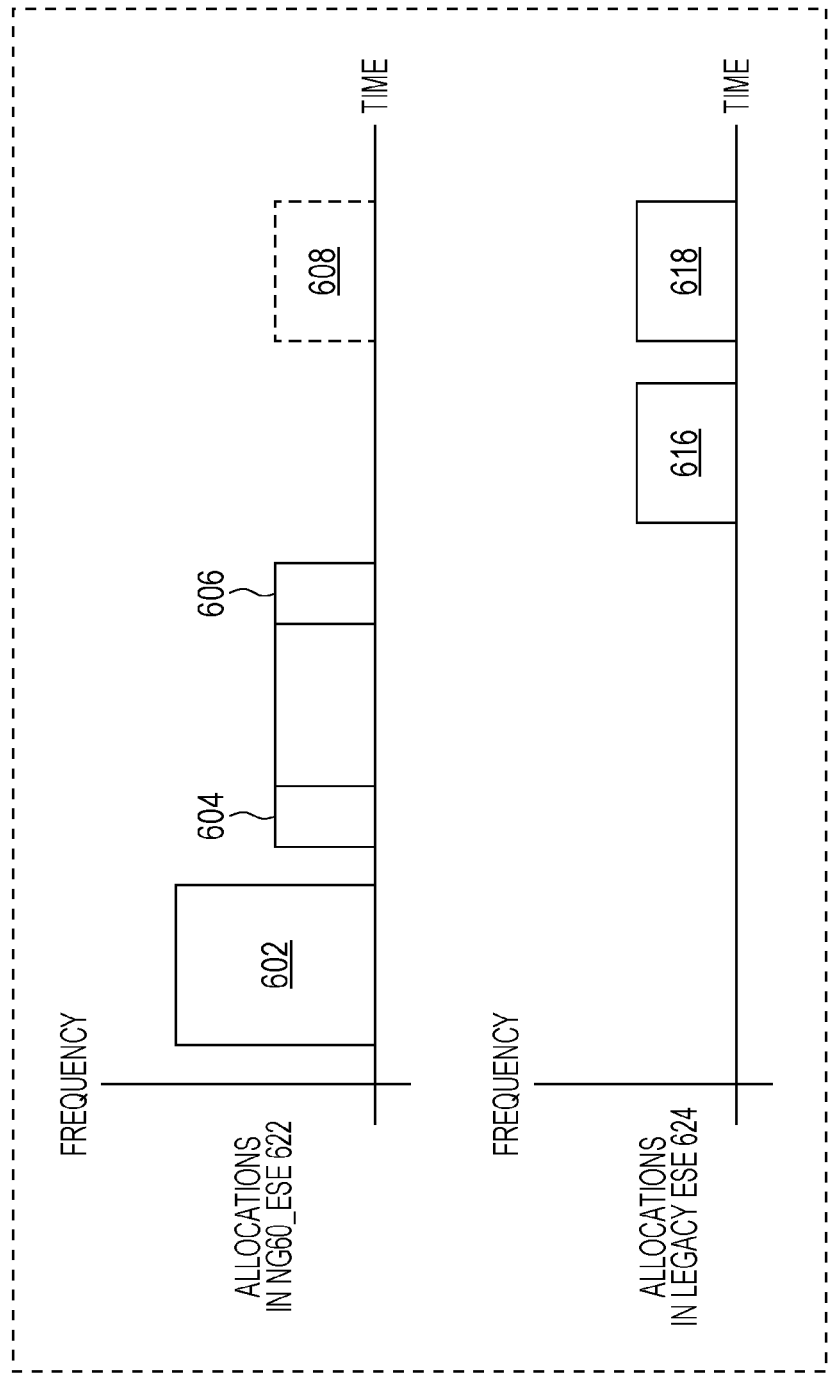
FIG. 6 is a diagram illustrating a first example of allocations in accordance with an NG60_ESE and a legacy ESE according to an embodiment of the present disclosure.

Now, allocations in an NG60_ESE and in a legacy ESE according to this embodiment are described with reference to the drawings. FIG. 6 is a diagram illustrating a first example of allocations in an NG60_ESE 622 and in a legacy ESE 624 according to an embodiment of the present disclosure. FIG. 6 illustrates scheduling information regarding channel time allocation indicated by the allocation fields included in the NG60_ESE (that is, time-frequency resources) and time-frequency resources indicated by the allocation fields included in the legacy ESE. In FIG. 6, the vertical axis related to the allocations in the NG60_ESE 622 and the vertical axis related to the allocations in the legacy ESE 624 represent a frequency on the same scale, and the horizontal axis related to the allocations in the NG60_ESE 622 and the horizontal axis related to the allocations in the legacy ESE 624 represent time on the same scale.

The allocations in the legacy ESE 624 in FIG. 6 include allocations 616 and 618, which are real allocations. The allocation 616 includes information regarding a communication device based on legacy WiGig (for example, a legacy STA), and the allocation 618 includes information regarding a communication device based on NG60_WiGig (for example, an NG60_STA).

The allocations in the NG60_ESE 622 in FIG. 6 include allocations 602, 604, 606, and 608. The allocations 602, 604, and 606 are real allocations, and the allocation 608 is a virtual allocation. Each of the real allocations indicates a time-frequency resource used in actual communication by one of the NG60_STAs that receive the NG60_ESE. The virtual allocation indicates a time-frequency resource that is not used in actual communication by any NG60_STA that receives the NG60_ESE but is being used by another device (for example, a legacy STA).

NG60_WiGig supports communication using a variable channel bandwidth, and therefore, the allocation 602 in the NG60_ESE 622 has a channel bandwidth different from that of the allocations 604 and 606. On the other hand, the allocation 616 and the allocation 618 in the legacy ESE 624 have a channel bandwidth of 2.16 GHz.

The virtual allocation 608 is obtained by using and duplicating the allocation 618 among the allocations in the legacy ESE 624.

The NG60_ESE illustrated in FIG. 6 includes all allocations for transmission related to an NG60_STA. As a result, after an NG60_STA associated with the NG60_PCP/AP 502 or 504 has received a DMG beacon including the NG60_ESE and the legacy ESE from the NG60_PCP/AP 502 or 504, the NG60_STA need not analyze both the NG60_ESE and the legacy ESE and needs to analyze the NG60_ESE. Accordingly, the NG60_STA can reduce power consumption.

Further, in the present disclosure, an SPSH (spatial sharing) mechanism can be employed in order to maximize the performance of a BSS. With the SPSH mechanism, two or more SP allocations that belong to different STAs in the same spatial vicinity can be simultaneously scheduled on the same channel. In this case, the two or more SP allocations under SPSH may partially or completely overlap in the time domain.

For example, as illustrated in FIG. 5 and FIG. 6, the allocation 604 in the NG60_ESE 622 is an allocation for communication between the STA 512*a* and the STA 512*b*, and the allocation 606 in the NG60_ESE 622 is an allocation for communication between the STA 514*a* and the STA 514*b*. Regarding the allocations under SPSH, the allocations 604 and 606 partially overlap in the time domain.

In the above description, the configuration in which an NG60_PCP/AP creates a duplicate allocation (virtual allocation) also in an NG60_ESE from a real allocation in a legacy ESE is described. Now, a configuration in which an NG60_PCP/AP creates a duplicate allocation (virtual allocation) also in a legacy ESE from a real allocation in an NG60_ESE is described.

Figure 7B:
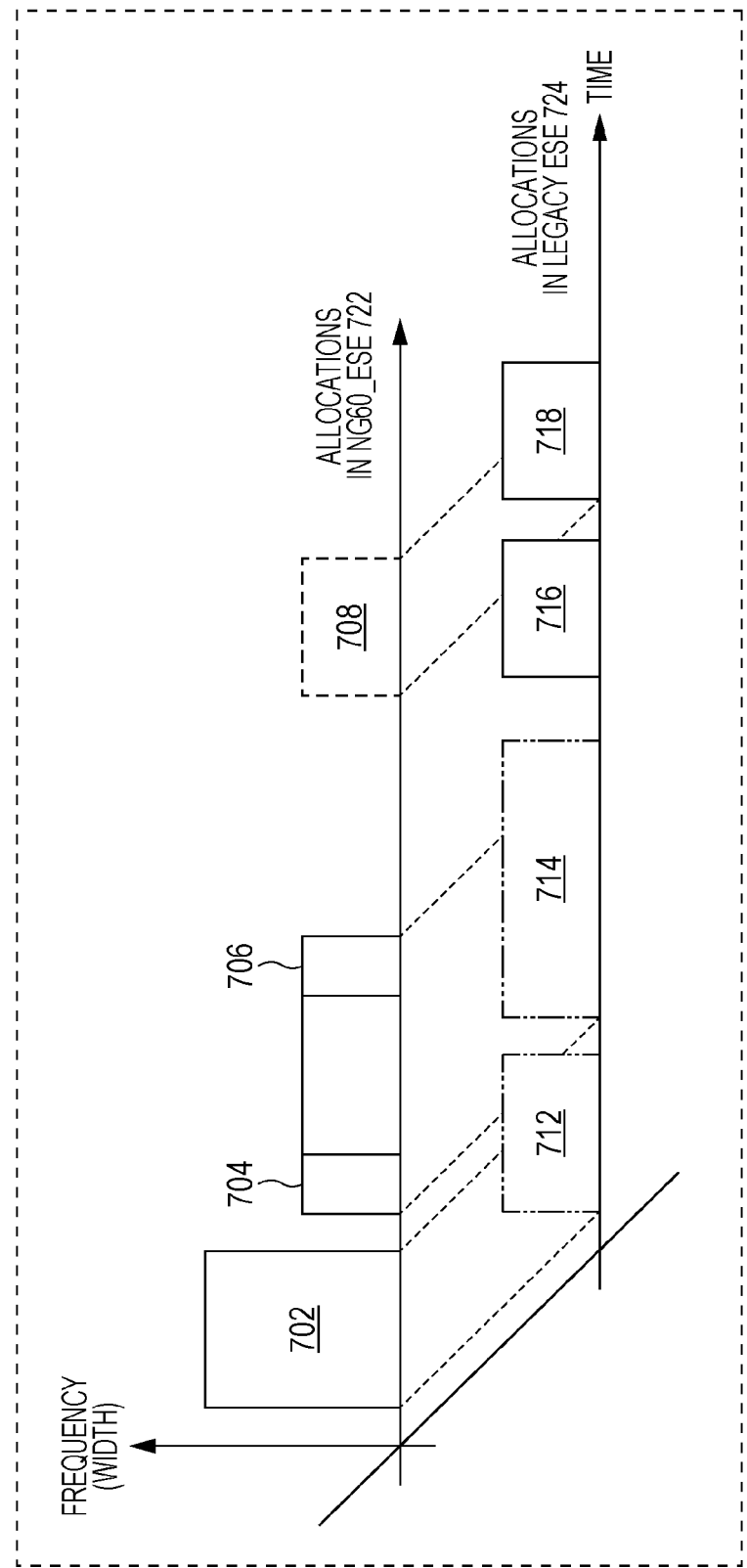
FIG. 7B is a diagram illustrating the second example illustrated in FIG. 7A in a different form.

FIG. 7A is a diagram illustrating a second example of allocations in accordance with an NG60_ESE and a legacy ESE according to an embodiment of the present disclosure. FIG. 7B is a diagram illustrating the second example illustrated in FIG. 7A in a different form. In FIG. 7A and FIG. 7B, the vertical axis related to the allocations in an NG60_ESE 722 and the vertical axis related to the allocations in a legacy ESE 724 represent a frequency on the same scale, and the horizontal axis related to the allocations in the NG60_ESE 722 and the horizontal axis related to the allocations in the legacy ESE 724 represent time on the same scale. Further, the allocations in the NG60_ESE 722 are the same as the allocations in the NG60_ESE 622 illustrated in FIG. 6.

A virtual allocation 712 in the legacy ESE 724 is a virtual allocation corresponding to a single real allocation 702 in the NG60_ESE 722, and a virtual allocation 714 is a virtual allocation corresponding to two real allocations 704 and 706 under SPSH.

Note that the virtual allocation 712 indicates a frequency bandwidth different from that of the real allocation 702. This is because an NG60_ESE has the bandwidth parameter field while a legacy ESE does not have the bandwidth parameter field. However, a legacy STA or a legacy PCP/AP can reschedule channel time allocation for suppressing interference or perform any other appropriate operations as long as the legacy STA or the legacy PCP/AP can recognize the time width of the real allocation 702 in the NG60_ESE. Therefore, the virtual allocation 712 in the legacy ESE indicates the time width of the allocation 702 without using the bandwidth parameter field so that the time width of the real allocation 702 can be recognized upon decoding the legacy ESE.

According to the structure of the legacy ESE illustrated in FIG. 7A and FIG. 7B, a legacy STA or a legacy PCP/AP that has difficulty in decoding an NG60_ESE decodes a legacy ESE to thereby recognize a virtual allocation corresponding to a real allocation in the NG60_ESE. Accordingly, the legacy STA or the legacy PCP/AP can reschedule channel time allocation or perform any other appropriate operations.

According to the structure of the legacy ESE illustrated in FIG. 7A and FIG. 7B, a single virtual allocation (for example, the virtual allocation 714) is created from a plurality of real allocations (for example, the allocation 704 and the allocation 706). Accordingly, unlike in the case of creating a virtual allocation from a single real allocation, system overhead involved can be decreased.

A virtual allocation (for example, the virtual allocation 714) in the legacy ESE completely overlaps corresponding real allocations (for example, the allocation 704 and the allocation 706) in the NG60_ESE in the time domain. That is, the virtual allocation 714 in the legacy ESE and the corresponding real allocations 704 and 706 in the NG60_ESE have the same allocation start timing and at least have the same overall allocation duration.

A method for creating a virtual allocation (for example, the virtual allocation 712) in the legacy ESE from a single real allocation (for example, the allocation 702) in the NG60_ESE is performed such that information fields in the allocation field of the virtual allocation 712 that are related to the timing of allocation (that is, the allocation start field, the allocation block duration field, the number-of-blocks field, and the allocation block period field) are the same as those of the corresponding real allocation 702. Accordingly, the virtual allocation 712 completely overlaps the corresponding real allocation 702 in the time domain.

In the case of creating a virtual allocation (for example, the virtual allocation 714) in the legacy ESE from a plurality of real allocations (for example, the allocations 704 and 706) in the NG60_ESE, information fields of the virtual allocation 714 that are related to the timing of allocation (that is, the allocation start field, the allocation block duration field, the number-of-blocks field, and the allocation block period field) are appropriately adapted on the basis of the information fields of the corresponding real allocations 704 and 706 by performing any of the first to third methods, for example, described below. The allocation start field of the virtual allocation 714 is set to the same value as that of an allocation that starts earliest (for example, the allocation 704) among the plurality of corresponding real allocations.

In the first method, two fields among the allocation block duration field, the number-of-blocks field, and the allocation block period field of the virtual allocation 714 are respectively set to the same values as those of the real allocation 704. The remaining field is appropriately set so that the overall allocation duration of the corresponding real allocations 704 and 706 is completely covered.

In the second method, any one of the allocation block duration field, the number-of-blocks field, and the allocation block period field of the virtual allocation 714 is set to the same value as that of the real allocation 704. The remaining two fields are appropriately set so that the overall allocation duration of the corresponding real allocations 704 and 706 is completely covered.

In the third method, all of the allocation block duration field, the number-of-blocks field, and the allocation block period field of the virtual allocation 714 are appropriately set so that the overall allocation duration of the corresponding real allocations 704 and 706 is completely covered.

In the case of creating a virtual allocation in a legacy ESE from one or more real allocations in an NG60_ESE, one of or both the information fields (that is, the source AID and the destination AID) of the virtual allocation that are related to identification information regarding the allocation may be set to specific values that uniquely indicate the virtual allocation. In this case, an NG60_STA or an NG60_PCP/AP can easily identify the virtual allocation in the received legacy ESE.

Note that an NG60_PCP/AP need not create, for each real allocation in an NG60_ESE, a corresponding virtual allocation in a legacy ESE. For example, an NG60_PCP/AP may disable, for a real allocation, in an NG60_ESE, that is not semi-static, creation of a corresponding virtual allocation in a legacy ESE. Determination as to whether a real allocation is semi-static is performed on the basis of the semi-static field included in the allocation field. With such a method, extra system overhead involved can be reduced.

Further, in a case where an NG60_PCP/AP recognizes that a neighboring BSS includes no legacy PCP/AP or legacy STA, the NG60_PCP/AP may disable creation of a virtual allocation in a legacy ESE. With such a method, extra system overhead involved can be reduced.

Further, the allocations in the NG60_ESE 722 illustrated in FIG. 7A and FIG. 7B include a virtual allocation 708, which corresponds to an allocation 718 in the legacy ESE 724. However, the allocations in an NG60_ESE according to the present disclosure need not include a virtual allocation that corresponds to an allocation in a legacy ESE.

Now, the format of an NG60_ESE according to this embodiment is described.

Figure 8:
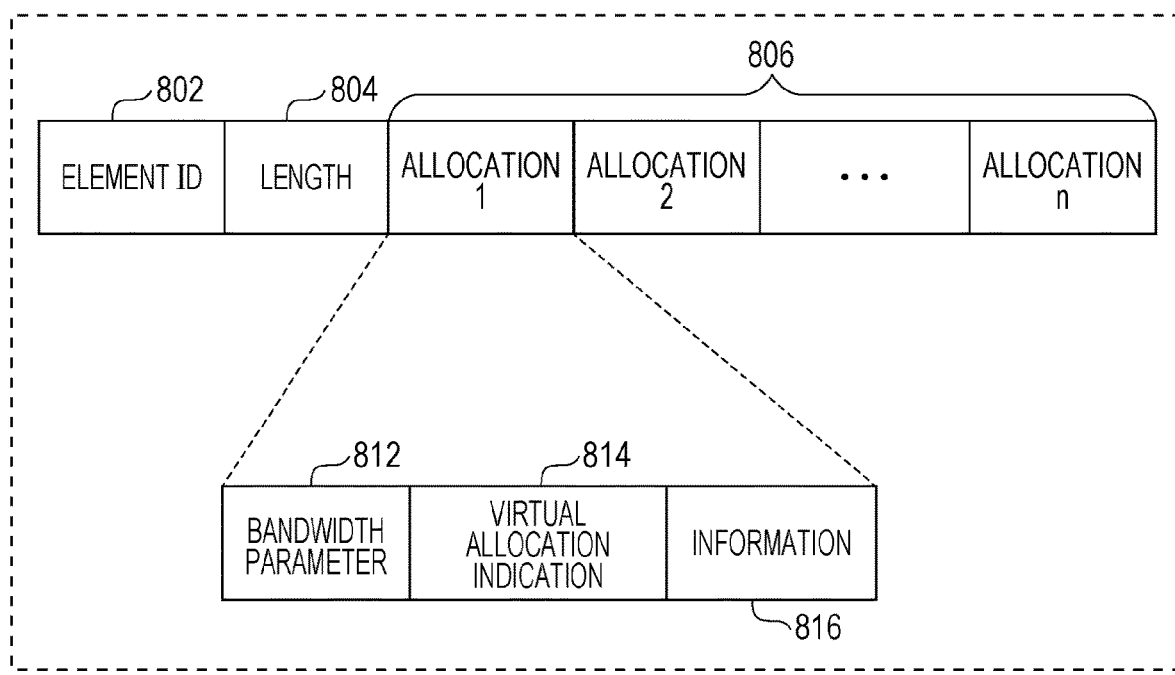
FIG. 8 is a diagram illustrating an example format of an NG60_ESE according to an embodiment of the present disclosure.

FIG. 8 is a diagram illustrating an example format of an NG60_ESE according to an embodiment of the present disclosure. The format of the NG60_ESE illustrated in FIG. 8 includes an element ID field 802, a length field 804, and a plurality of allocation fields 806. Each of the allocation fields 806 includes a bandwidth parameter field 812, a virtual allocation indication field 814, and an information field 816. The element ID field 802 and the length field 804 are the same as the element ID field 402 and the length field 404 illustrated in FIG. 4.

The bandwidth parameter field 812 indicates the channel bandwidth of the corresponding allocation. The virtual allocation indication field 814 indicates whether a virtual allocation corresponding to the allocation is present in a legacy ESE. The information field 816 includes any information, data, or both information and data that are included in the allocation field in the legacy ESE as specified in FIG. 3.

The virtual allocation indication field 814 is used to identify the channel bandwidth of the allocation in a case where an NG60_STA needs to analyze both an NG60_ESE and a legacy ESE. For example, an NG60_STA checks whether the allocation ID of an allocation included in the legacy ESE matches the allocation ID of an allocation included in the NG60_ESE and checks a flag (the presence or absence of a virtual allocation) of the virtual allocation indication field 814 to thereby identify the channel bandwidth. Accordingly, the NG60_STA need not analyze the other fields of the NG60_ESE.

In this embodiment, as a method for including (encapsulating) in a legacy ESE a virtual allocation corresponding to a real allocation in an NG60_ESE, the following methods can be employed.

In a first method, a virtual allocation created from a real allocation in an NG60_ESE as well as a real allocation is encapsulated in a legacy ESE. For example, as illustrated in FIG. 7A and FIG. 7B, the legacy ESE includes the virtual allocations 712 and 714 as well as a real allocation 716 and the real allocation 718.

In a second method, a virtual allocation created from a real allocation in an NG60_ESE is encapsulated in a virtual-allocation-only legacy ESE. The second method is described with reference to the drawings.

Figure 9:
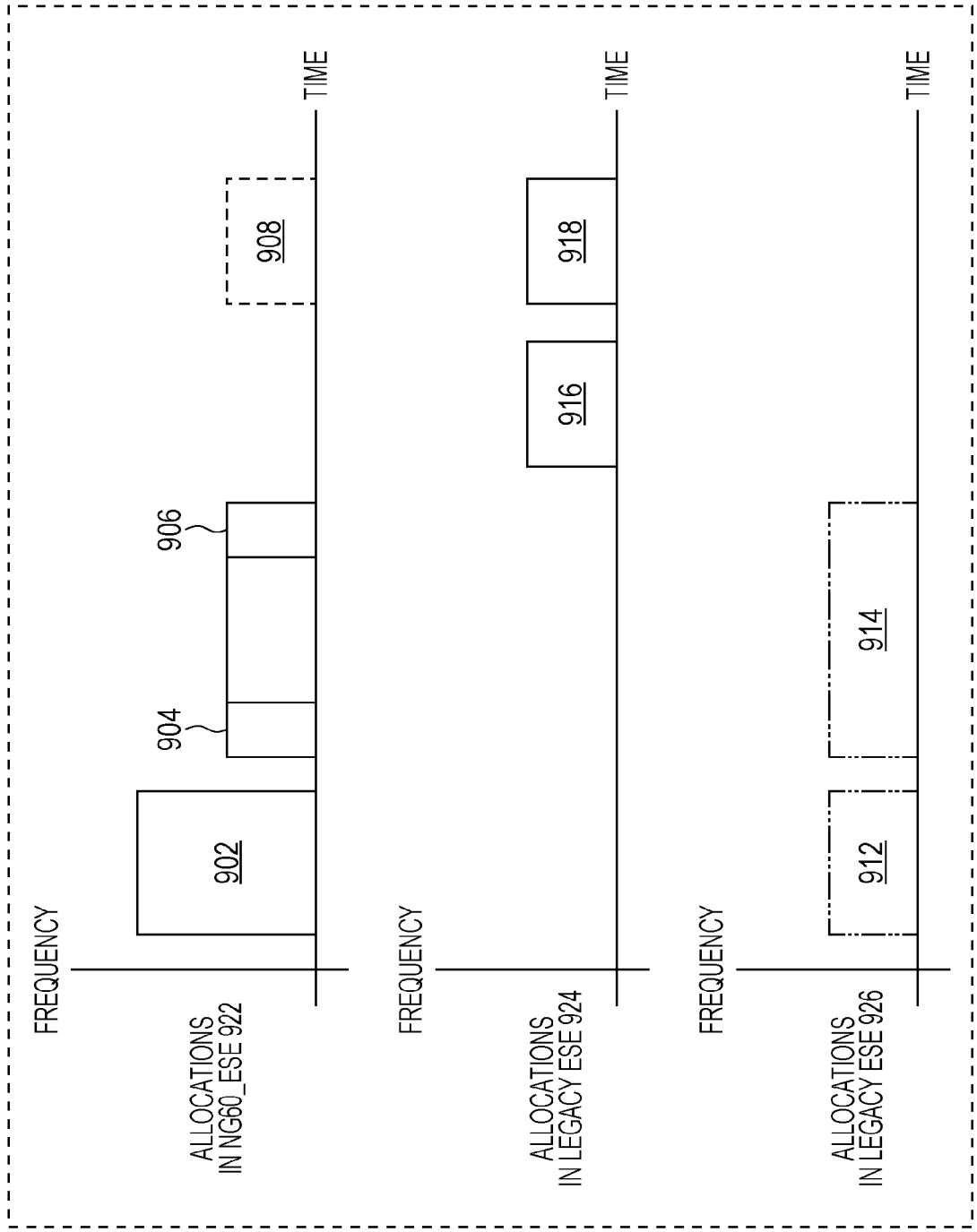
FIG. 9 is a diagram illustrating a third example of allocations in accordance with an NG60_ESE and legacy ESEs according to an embodiment of the present disclosure.

FIG. 9 is a diagram illustrating a third example of allocations in accordance with an NG60_ESE and legacy ESEs according to an embodiment of the present disclosure. In FIG. 9, the allocations in an NG60_ESE 922 are the same as the allocations in the NG60_ESE 622 illustrated in FIG. 6.

In FIG. 9, allocations 916 and 918 are real allocations. A virtual allocation 912 is a virtual allocation corresponding to a single real allocation 902 in the NG60_ESE 922, and a virtual allocation 914 is a virtual allocation corresponding to two real allocations 904 and 906.

As illustrated in FIG. 9, a legacy ESE 924 includes the real allocations 916 and 918. On the other hand, a legacy ESE 926 serves as a virtual-allocation-only legacy ESE and includes the virtual allocations 912 and 914.

The number of legacy ESEs is smaller in the first method when compared with that in the second method. However, in the second method, processing by a receiver in an NG60_STA is simplified, which is described below.

Now, description is given of operations of a legacy PCP/AP, those of a legacy STA, those of an NG60_PCP/AP, and those of an NG60_STA according to this embodiment described above.

When a legacy PCP/AP (506, for example) receives a DMG beacon including an NG60_ESE and a legacy ESE directly from an NG60_PCP/AP (504, for example), the legacy PCP/AP 506 analyzes the received legacy ESE. Virtual allocations in the received legacy ESE completely overlap real allocations in the received NG60_ESE respectively corresponding to the virtual allocations in the time domain. Therefore, the legacy PCP/AP 506 can reschedule allocations thereof or perform any other appropriate operations in an attempt to suppress interference with transmission indicated by the received NG60_ESE and legacy ESE.

When a legacy STA receives a DMG beacon including an NG60_ESE and a legacy ESE from an NG60_PCP/AP (for example, the NG60_PCP/AP 504) associated therewith, the legacy STA analyzes the received legacy ESE and checks a tuple (the allocation ID, the source AID, and the destination AID) to thereby identify real allocations. The format of the NG60_ESE is different from the format of the legacy ESE, and therefore, the legacy STA does not decode the received NG60_ESE.

When a legacy STA associated with a legacy PCP/AP (for example, the legacy PCP/AP 506) receives a DMG beacon including an NG60_ESE and a legacy ESE from an NG60_PCP/AP (for example, the NG60_PCP/AP 504), the legacy STA simply transmits one or more frames that include the received legacy ESE to the legacy PCP/AP 506. Virtual allocations in the received legacy ESE completely overlap respective corresponding real allocations in the NG60_ESE in the time domain, and therefore, the legacy PCP/AP 506 can reschedule allocations thereof or perform any other appropriate operations in an attempt to suppress interference with transmission indicated by the NG60_ESE and the legacy ESE.

When a legacy STA associated with an NG60_PCP/AP (for example, the NG60_PCP/AP 502) receives a DMG beacon including an NG60_ESE and a legacy ESE from another NG60_PCP/AP (for example, the NG60_PCP/AP 504), the legacy STA simply transmits one or more frames that include the received legacy ESE to the NG60_PCP/AP 502. Virtual allocations in the received legacy ESE completely overlap respective corresponding real allocations in the NG60_ESE in the time domain, and therefore, the NG60_PCP/AP 502 can reschedule allocations thereof or perform any other appropriate operations in an attempt to suppress interference with transmission indicated by the NG60_ESE and the legacy ESE.

When an NG60_PCP/AP (for example, the NG60_PCP/AP 502) receives a DMG beacon including an NG60_ESE and a legacy ESE directly from another NG60_PCP/AP (for example, the NG60_PCP/AP 504), the NG60_PCP/AP 502 analyzes the received NG60_ESE and legacy ESE. The NG60_PCP/AP 502 needs to identify and ignore virtual allocations in the received legacy ESE. Then, the NG60_PCP/AP 502 can reschedule allocations thereof or perform any other appropriate operations in an attempt to suppress interference with transmission indicated by the received NG60_ESE and legacy ESE.

When an NG60_STA receives a DMG beacon including an NG60_ESE and a legacy ESE from an NG60_PCP/AP (for example, the NG60_PCP/AP 504) associated therewith, the NG60_STA analyzes the received NG60_ESE and identifies real allocations. The NG60_STA needs to identify real allocations by analyzing the received legacy ESE and discard virtual allocations. In a case where virtual allocations are encapsulated in a virtual-allocation-only legacy ESE, the NG60_STA can stop analyzing the virtual-allocation-only legacy ESE upon identifying the virtual allocations in the virtual-allocation-only legacy ESE.

When an NG60_STA associated with a legacy PCP/AP (for example, the legacy PCP/AP 506) receives a DMG beacon including an NG60_ESE and a legacy ESE from an NG60_PCP/AP (for example, the NG60_PCP/AP 504), the NG60_STA can transmit one or more frames that include the received legacy ESE to the legacy PCP/AP 506. Alternatively, the NG60_STA can analyze the received NG60_ESE. Then, the NG60_STA can create, in the received legacy ESE, virtual allocations that correspond to real allocations for which virtual allocations are not present at the discretion thereof and transmit one or more frames that include the received legacy ESE to the legacy PCP/AP 506. The virtual allocations in the received legacy ESE completely overlap the respective corresponding real allocations in the NG60_ESE in the time domain, and therefore, the legacy PCP/AP 506 can reschedule allocations thereof or perform any other appropriate operations in an attempt to suppress interference with transmission indicated by the NG60_ESE and the legacy ESE.

When an NG60_STA associated with an NG60_PCP/AP (for example, the NG60_PCP/AP 502) receives a DMG beacon including an NG60_ESE and a legacy ESE from another NG60_PCP/AP (for example, the NG60_PCP/AP 504), the NG60_STA transmits one or more frames that include the received NG60_ESE and legacy ESE to the NG60_PCP/AP 502. The NG60_PCP/AP 502 needs to identify and ignore virtual allocations in the received legacy ESE. Then, the NG60_PCP/AP 502 can reschedule allocations thereof or perform any other appropriate operations in an attempt to suppress interference with transmission indicated by the NG60_ESE and the legacy ESE.

In a case of generating a virtual allocation (for example, the virtual allocation 712) in a legacy ESE from a single real allocation (for example, the allocation 702) in an NG60_ESE, information fields of the virtual allocation 712 other than information fields related to the timing of allocation (that is, the allocation start field, the allocation block duration field, the number-of-blocks field, and the allocation block period field) and identification information regarding the allocation (that is, the source AID and the destination AID) can be set to the same values as those of the corresponding real allocation 702. As a result, a legacy PCP/AP or an NG60_PCP/AP can use such information to perform determination regarding a method for rescheduling allocations thereof or regarding a method for performing any other appropriate operations in an attempt to mitigate interference with transmission indicated by the NG60_ESE on the basis of the received legacy ESE.

In a case of generating a virtual allocation (for example, the virtual allocation 714) in a legacy ESE from a plurality of real allocations (for example, the allocations 704 and 706) in an NG60_ESE, information fields of the virtual allocation 714 other than information fields related to the timing of allocation (that is, the allocation start field, the allocation block duration field, the number-of-blocks field, and the allocation block period field) and identification information regarding the allocation (that is, the source AID and the destination AID) can be set to the same values as those of an allocation (for example, the allocation 704) that starts earliest among the plurality of corresponding real allocations. As a result, a legacy PCP/AP or an NG60_PCP/AP can use such information to perform determination regarding a method for rescheduling allocations thereof or regarding a method for performing any other appropriate operations in an attempt to suppress interference with transmission indicated by the NG60_ESE on the basis of the received legacy ESE.

Now, the configuration and process of an NG60_PCP/AP and those of an NG60_STA according to this embodiment are described with reference to the drawings.

Figure 10:
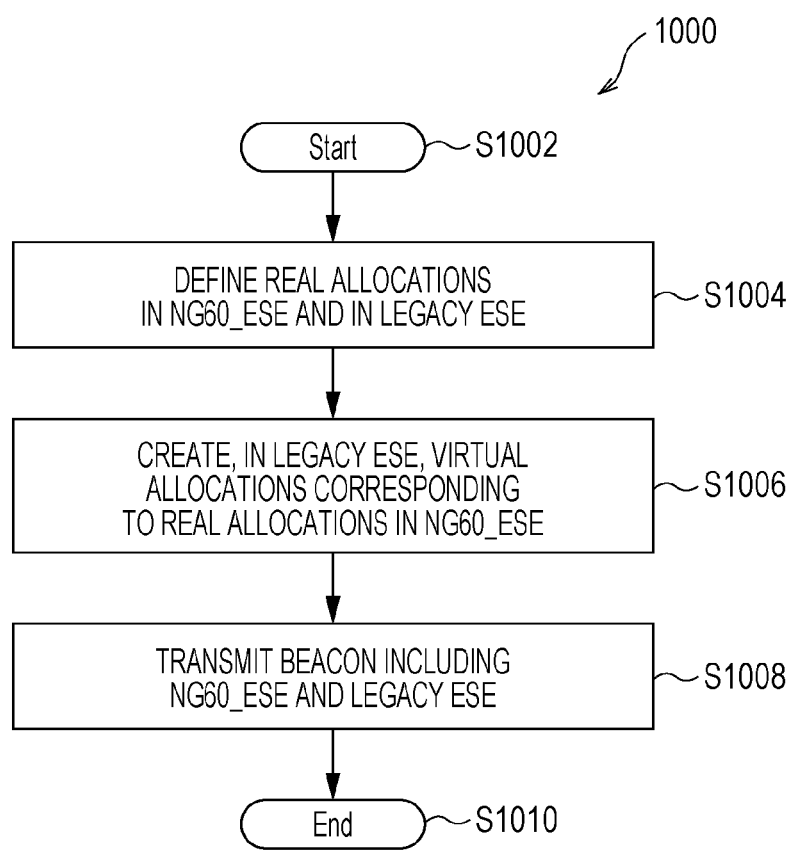
FIG. 10 is a flowchart illustrating a transmission process for transmitting ESEs by an NG60_PCP/AP according to an embodiment of the present disclosure.

FIG. 10 is a flowchart illustrating a transmission process 1000 for transmitting ESEs by an NG60_PCP/AP according to an embodiment of the present disclosure.

The transmission process 1000 performed by an NG60_PCP/AP starts at step S1002. In step S1004, an NG60_PCP/AP (for example, the NG60_PCP/AP 504) defines real allocations in an NG60_ESE and in a legacy ESE. Specifically, the NG60_PCP/AP determines time-frequency resources to be allocated to an STA that is associated therewith and generates an NG60_ESE or a legacy ESE by using the determined resources as real allocations.

In step S1006, the NG60_PCP/AP 504 creates, in the legacy ESE, virtual allocations that correspond to the real allocations in the NG60_ESE at the discretion thereof by performing any of the first to third methods, for example, described above. In step S1008, the NG60_PCP/AP 504 transmits a DMG beacon that includes the legacy ESE and the NG60_ESE. At step S1010, the process 1000 ends.

Figure 11:
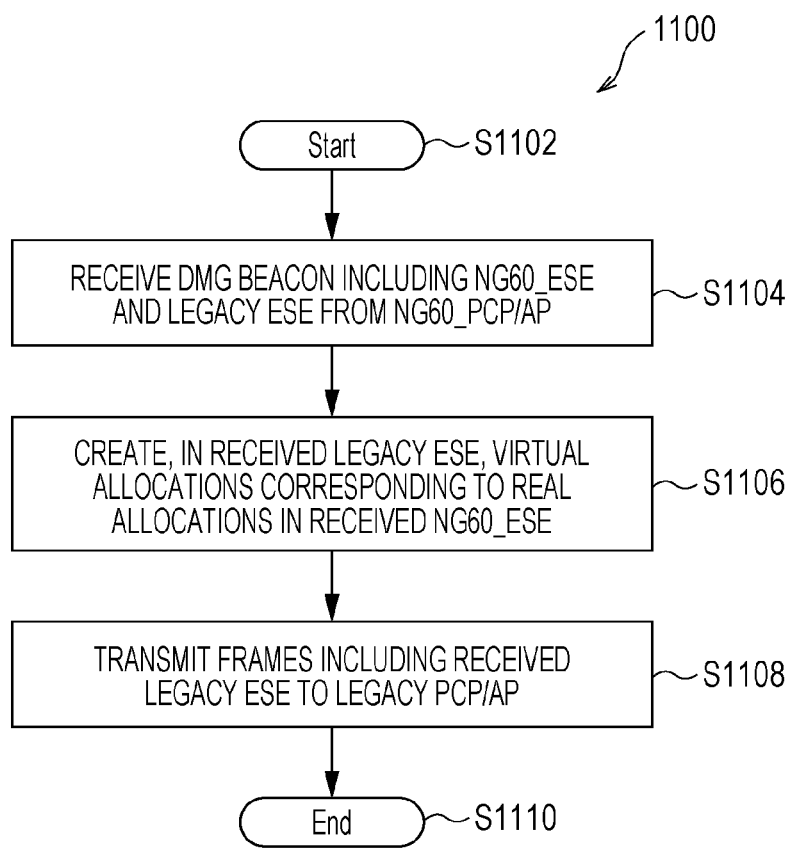
FIG. 11 is a flowchart illustrating a transmission process for transmitting an ESE by an NG60_STA according to an embodiment of the present disclosure.

FIG. 11 is a flowchart illustrating a transmission process 1100 for transmitting an ESE by an NG60_STA according to an embodiment of the present disclosure.

The transmission process 1100 for transmitting scheduling information by an NG60_STA starts at step S1102. In step S1104, an NG60_STA associated with a legacy PCP/AP (for example, the legacy PCP/AP 506) receives a DMG beacon that includes an NG60_ESE and a legacy ESE from an NG60_PCP/AP (for example, the NG60_PCP/AP 504).

In step S1106, the NG60_STA creates, in the received legacy ESE, virtual allocations that correspond to real allocations in the received NG60_ESE at the discretion thereof by performing any of the first to third methods, for example, described above. In step S1108, the NG60_STA transmits one or more frames that include the received legacy ESE to the legacy PCP/AP 506. At step S1110, the process 1100 ends.

Figure 12:
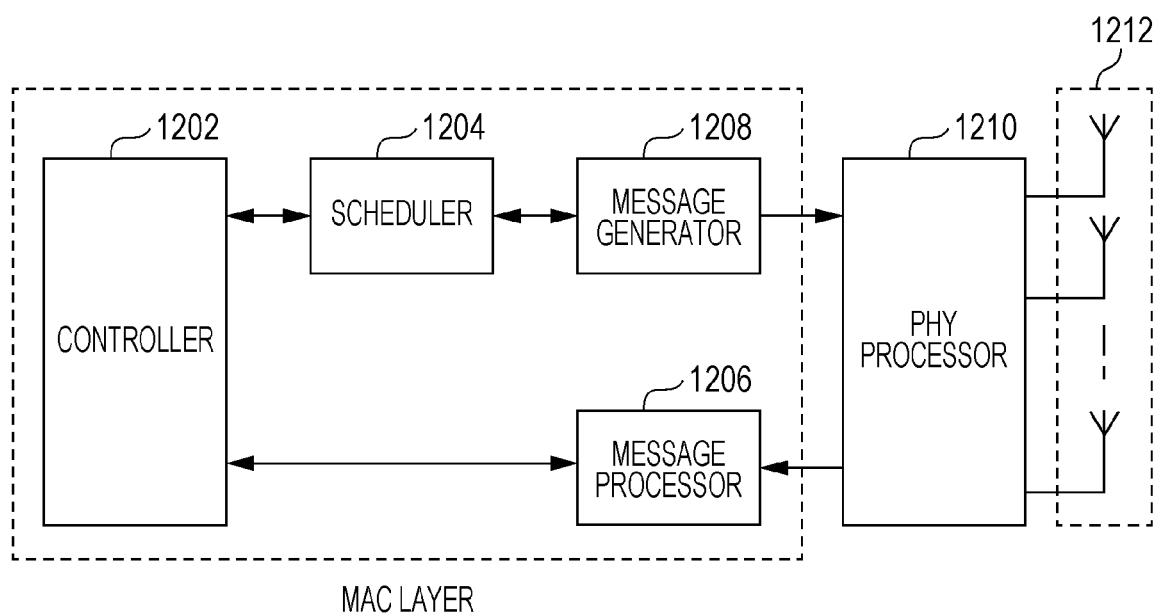
FIG. 12 is a block diagram illustrating an example configuration of an NG60_PCP/AP according to an embodiment of the present disclosure.

FIG. 12 is a block diagram illustrating an example configuration of an NG60_PCP/AP according to an embodiment of the present disclosure.

The NG60_PCP/AP illustrated in FIG. 12 includes a controller 1202, a scheduler 1204, a message processor 1206, a message generator 1208, a PHY processor 1210, and a plurality of antennas 1212.

The controller 1202 is a MAC protocol controller and controls general MAC protocol operations.

The scheduler 1204 schedules channel time allocation in accordance with control by the controller 1202.

The message generator 1208 receives scheduling information from the scheduler 1204 and generates a corresponding control message, such as a DMG beacon, a data message, or a management message.

The PHY processor 1210 performs a PHY process, such as modulation, on transmission data, namely, the corresponding control message, such as a DMG beacon that includes a legacy ESE and an NG60_ESE, the data message, the management message, or other messages. The plurality of antennas 1212 transmit the transmission data, which has been subjected to the PHY process.

The antennas 1212 receive reception data, and the PHY processor 1210 performs a PHY process, such as demodulation, on the reception data.

The message processor 1206 analyzes and provides, to the controller 1202, received messages. The received messages include a DMG beacon. The DMG beacon includes an NG60_ESE and a legacy ESE, and the legacy ESE includes virtual allocations that correspond to real allocations in the NG60_ESE.

The NG60_PCP/AP illustrated in FIG. 12 performs the transmission process 1000 illustrated in FIG. 10 as follows.

The scheduler 1204 defines real allocations in an NG60_ESE and in a legacy ESE as scheduling. Specifically, the scheduler 1204 determines time-frequency resources to be allocated to an STA that is associated therewith and generates an NG60_ESE or a legacy ESE by using the determined resources as real allocations.

The message generator 1208 receives information regarding the real allocations (that is, information regarding the determined resources) from the scheduler 1204 and creates, in the legacy ESE, virtual allocations that correspond to the real allocations in the NG60_ESE. The legacy ESE, which includes the virtual allocations, as well as the NG60_ESE is included in a DMG beacon.

The PHY processor 1210 performs a PHY process, such as modulation, on the DMG beacon, which includes the legacy ESE and the NG60_ESE. The plurality of antennas 1212 transmit transmission data that has been subjected to a PHY process.

Figure 13:
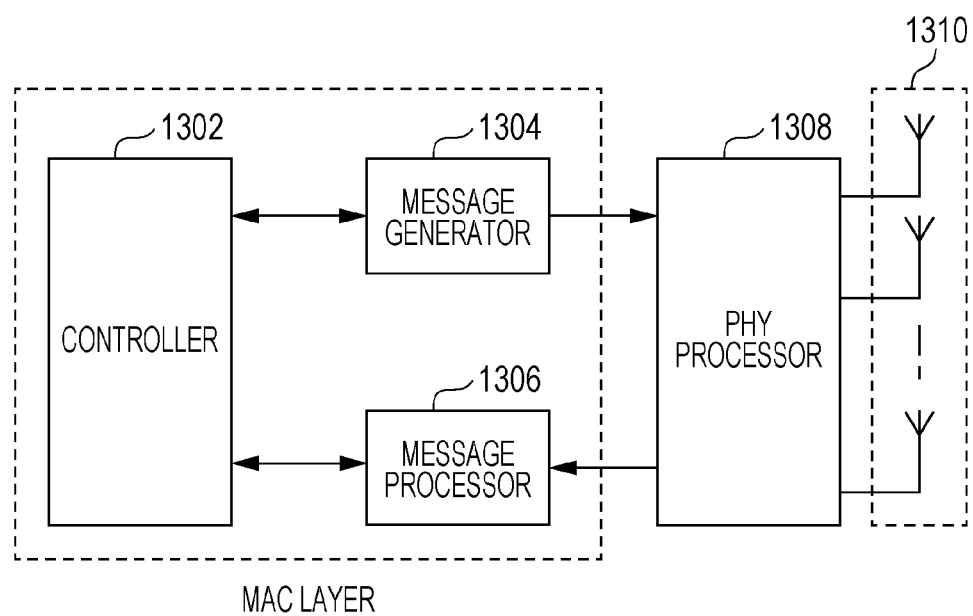
FIG. 13 is a block diagram illustrating an example configuration of an NG60_STA according to an embodiment of the present disclosure.

FIG. 13 is a diagram illustrating an example configuration of an NG60_STA according to an embodiment of the present disclosure. The NG60_STA illustrated in FIG. 13 includes a controller 1302, a message generator 1304, a message processor 1306, a PHY processor 1308, and a plurality of antennas 1310.

The controller 1302 is a MAC protocol controller and controls general MAC protocol operations.

The message generator 1304 generates a control message, a data message, or a management message in accordance with control by the controller 1302.

A message generated by the message generator 1304 includes frames that include an NG60_ESE and a legacy ESE received from an NG60_PCP/AP. The NG60_STA generates, in the legacy ESE, virtual allocations that correspond to real allocations in the received NG60_ESE.

The PHY processor 1308 performs a PHY process, such as modulation, on the message generated by the message generator 1304. The antennas 1310 transmit transmission data that has been subjected to a PHY process.

The antennas 1310 receive reception data, and the PHY processor 1308 performs a PHY process, such as demodulation, on the reception data.

The message processor 1306 analyzes and provides, to the controller 1302, a received control message, data message, or management message in accordance with control by the controller 1302.

The NG60_STA illustrated in FIG. 13 performs the process 1100 illustrated in FIG. 11 as follows.

The antennas 1310 receive a DMG beacon that includes an NG60_ESE and a legacy ESE from an NG60_PCP/AP (for example, the NG60_PCP/AP 504), and the PHY processor 1308 performs a PHY process, such as demodulation, on the received beacon. The message processor 1306 analyzes and provides, to the controller 1302, the NG60_ESE and the legacy ESE.

The message generator 1304 generates, in the received legacy ESE, virtual allocations that correspond to real allocations in the received NG60_ESE. The generated legacy ESE and the received NG60_ESE are subjected to a PHY process, such as modulation, by the PHY processor 1308, and thereafter, are transmitted via the antennas 1310.

Note that the configurations illustrated in FIG. 12 and FIG. 13 can be implemented by using hardware, such as an LSI circuit. The method for circuit integration is not limited to LSI, and a dedicated circuit or a general-purpose processor may be used for circuit integration. An FPGA (field-programmable gate array), which is programmable after LSI manufacture, or a reconfigurable processor, which allows reconfiguration of connections or settings of circuit cells inside the LSI circuit, may be used.

In the above-described embodiment, the example case of configuring the present disclosure by using hardware is described; however, the present disclosure can be implemented by using software.

According to this embodiment described above, a legacy STA or a legacy PCP/AP that has difficulty in decoding an NG60_ESE decodes a legacy ESE to thereby recognize virtual allocations that correspond to real allocations in the NG60_ESE. Accordingly, the legacy STA or the legacy PCP/AP can reschedule channel time allocation or perform any other appropriate operations.

The communication method and the communication device according to the present disclosure are desirably used in communication over a millimeter-wave network.

What is claimed is:

1. A communication method for a personal basic service set Control Point/Access Point (PCP/AP) device, the communication method comprising:
    generating a frame including a legacy scheduling element and a non-legacy scheduling element, wherein the legacy scheduling element includes one or more first allocation field(s) indicating resource allocation for a legacy communication device and includes one or more third allocation field(s) indicating duration information of resource allocation over a plurality of channels for a non-legacy communication device, and wherein the non-legacy scheduling element includes one or more second allocation field(s) indicating channel information of the resource allocation over the plurality of channels for the non-legacy communication device, each of the one or more third allocation field(s) in the legacy scheduling element corresponds to one of the one or more second allocation field(s) in the non-legacy scheduling element; and
    transmitting the generated frame to the legacy communication device and to the non-legacy communication device.

2. The communication method according to claim 1, wherein each of the one or more third allocation field(s) in the legacy scheduling element comprise an Allocation Start subfield, an Allocation Block Duration subfield and a Number of Blocks subfield.

3. The communication method according to claim 2, wherein the Allocation Start subfield, the Allocation Block Duration subfield and the Number of Blocks subfield collectively indicate the duration information of resource allocation for the non-legacy communication device.

4. The communication method according to claim 1, wherein the one or more second allocation field(s) in the non-legacy scheduling element comprise a Bandwidth subfield.

5. The communication method according to claim 4, wherein the Bandwidth subfield indicates a bandwidth of at least one of the channels on which resource allocation is scheduled for the non-legacy communication device.

6. The communication method according to claim 1, wherein the one or more second allocation field(s) in the non-legacy scheduling element and the one or more third allocation field(s) in the legacy scheduling element are used by the non-legacy communication device to detect one or more allocations for the non-legacy communication device.

7. The communication method according to claim 1, wherein
    the one or more first allocation field(s) in the legacy scheduling element are used by the legacy communication device to detect one or more allocation(s) for the legacy communication device; and
    the one or more third allocation field(s) in the legacy scheduling element are used by the non-legacy communication device to detect one or more allocation(s) for the non-legacy communication device.

8. The communication method according to claim 1, wherein each of the one or more second allocation field(s) in the non-legacy scheduling element includes a scheduling type subfield indicating whether the legacy scheduling element includes a third allocation field corresponding to one of the one or more second allocation field(s) in the non-legacy scheduling element.

9. The communication method according to claim 8, wherein when the scheduling type subfield in one second allocation field indicates that the legacy scheduling element does not include a corresponding third allocation field, the one second allocation field further includes an allocation information subfield indicating duration information for the resource allocation for the non-legacy communication device.

10. A communication apparatus comprising:
a generator which, in operation, generates a frame including a legacy scheduling element and a non-legacy scheduling element, wherein the legacy scheduling element includes one or more first allocation field(s) indicating resource allocation for a legacy communication device and includes one or more third allocation field(s) indicating duration information of resource allocation over a plurality of channels for a non-legacy communication device, and wherein the non-legacy scheduling element includes one or more second allocation field(s) indicating channel information of the resource allocation over the plurality of channels for the non-legacy communication device, the one or more third allocation field(s) in the legacy scheduling element corresponds to one of the one or more second allocation field(s) in the non-legacy scheduling element; and
a transmitter which, in operation, transmits the generated frame to the legacy communication device and to the non-legacy communication device.

11. The communication apparatus according to claim 10, wherein each of the one or more third allocation field(s) in the legacy scheduling element comprise an Allocation Start subfield, an Allocation Block Duration subfield and a Number of Blocks subfield.

12. The communication apparatus according to claim 11, wherein the Allocation Start subfield, the Allocation Block Duration subfield and the Number of Blocks subfield collectively indicate the duration information of resource allocation for the non-legacy communication device.

13. The communication apparatus according claim 10, wherein the one or more second allocation field(s) in the non-legacy scheduling element comprise a Bandwidth subfield.

14. The communication apparatus according to claim 13, wherein the Bandwidth subfield indicates a bandwidth of at least one of the channels on which resource allocation is scheduled for the non-legacy communication device.

15. The communication apparatus according to claim 10, wherein the one or more second allocation field(s) in the non-legacy scheduling element and the one or more third allocation field(s) in the legacy scheduling element are used by the non-legacy communication device to detect one or more allocations for the non-legacy communication device.

16. The communication apparatus according to claim 10, wherein
the one or more first allocation field(s) in the legacy scheduling element are used by the legacy communication device to detect one or more allocation(s) for the legacy communication device; and
the one or more third allocation field(s) in the legacy scheduling element are used by the non-legacy communication device to detect one or more allocation(s) for the non-legacy communication device.

17. The communication apparatus according to claim 10, wherein each of the one or more second allocation field(s) in the non-legacy scheduling element includes a scheduling type subfield indicating whether the legacy scheduling element includes a third allocation field corresponding to one of the one or more second allocation field(s) in the non-legacy scheduling element.

18. The communication apparatus according to claim 17, wherein when the scheduling type subfield in one second allocation field indicates that the legacy scheduling element does not include a corresponding third allocation field, the one second allocation field further includes an allocation information subfield indicating duration information for the resource allocation for the non-legacy communication device.

* * * * *